(No Model.)

T. T. MORRELL.
REGENERATIVE FURNACE.

No. 313,754. Patented Mar. 10, 1885.

WITNESSES
Edwin L. Jewell
W. Shneabaugh

INVENTOR
Thomas T. Morrell,
By D. W. Ginsabaugh
Attorney

UNITED STATES PATENT OFFICE.

THOMAS T. MORRELL, OF JOHNSTOWN, PENNSYLVANIA.

REGENERATIVE FURNACE.

SPECIFICATION forming part of Letters Patent No. 313,754, dated March 10, 1885.

Application filed March 10, 1884. (No model.)

*To all whom it may concern:*

Be it known that I, THOMAS T. MORRELL, a citizen of the United States, residing at Johnstown, in the county of Cambria and State of Pennsylvania, have invented certain new and useful Improvements in Regenerative Furnaces, of which the following is a specification.

My invention relates to improvements in regenerator-furnaces.

The object of my invention is to provide a regenerator gas-furnace which can be operated to treat metals fusible at variable temperatures.

My invention consists of two sets of regenerators arranged at each end of the furnace—one for air and one for gas—the air-regenerators being provided with valves whereby the air can be mingled with the gas on its entrance to the melting-chamber or be carried over or supplied to the gases at the farther end of the furnace or after the gases have passed through the melting-chamber, so as to effect a complete combustion of said gases and utilize these products of combustion to heat the regenerator or regenerators.

My invention consists, further, in certain other details of construction, which will be fully described, and pointed out in the claims.

In most of these furnaces heretofore used, the combustible gases being heated by passing through regenerators or hot ovens are caused to burn in the body of the furnace or in a combustion-chamber at the side of the furnace by being mixed with air and ignited, the burning mixture passing through the body of the furnace which contains the substance to be heated or melted. In some instances it is not desirable to have the air mixed with the gas as it enters the combustion-chamber, for the reason that it rusts or oxidizes the body subjected to its action. I obviate this by burning the gases after they have passed through the furnace, thus heating the furnace and its contents only by the heat which the current of gas has taken up from the regenerators, and I utilize the heat of combustion to heat other regenerators. In case a strongly-oxidizing action is required, the air, strongly heated in the regenerators, is made to impart its heat to the furnace and its contents, and is burned as it is passing out of the furnace-chamber by being mixed with a current of combustible gas and ignited, and, as before, using the heat produced to heat regenerators to be used in turn.

Figure 1:
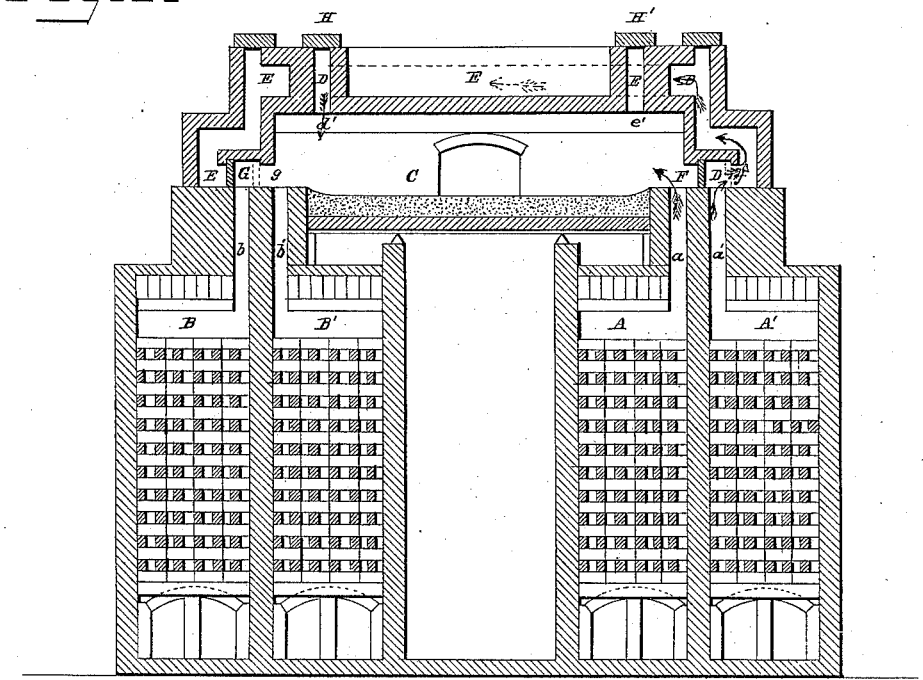
Figure 2:
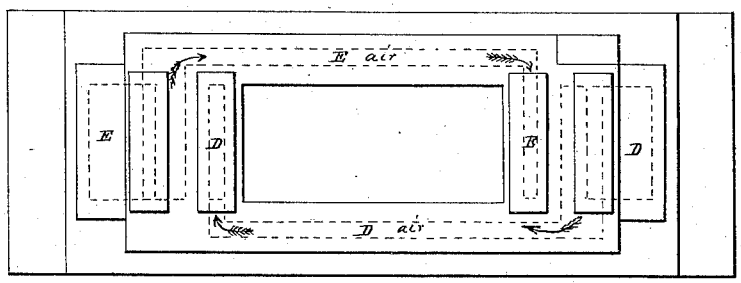

In the drawings accompanying this specification, Figure 1 is a vertical section of my improved furnace, and Fig. 2 is the top of the same.

A and A' and B and B' are regenerators of the ordinary construction, A and B' being used to heat the gas, and B and A' to heat the air, these regenerators having corresponding ports, $b$ $b'$ and $a$ $a'$, the furnace being supplied with reversing-valves operated in the usual way, so that the ports at each side or end of the furnace are used alternately for delivering gas or air into the furnace-chamber and discharging the products of combustion.

D and E are ports or flues for the passage of air.

F and G are valves shown in the position they will occupy when the furnace is working from right to left, the dotted lines $f$ and $g$ indicating the position of these valves when the furnace is reversed. These valves F and G are so constructed that they can be shifted to the positions indicated by the dotted lines and back again as desired by the insertion of a bar through a hole in the side or end of the furnace, or by any other method readily devised.

Except in the arrangement of the air flues and valves, the construction does not differ from that of an ordinary open-hearth furnace, the brick-work, lining, &c., being sufficiently indicated in the drawings without particular description.

The operation of the furnace with the valves in the position shown by the drawings is as follows: The ordinary reversing-valves of the furnace will be adjusted to send a current of gas through regenerator A, and a current of air through regenerator A'. This gas is heated in passing through the regenerator. It passes through the port $a$ into and across the chamber C, where it performs the work of heating and melting. The air entering regenerator A' is heated and passes through port $a'$ into flue D, through which it is carried to the point $d'$, where it encounters the gas, and at this point $d'$ combustion is effected, the products of combustion passing through regenerators B and B', to which they impart heat, and thence to the stack. When regenerators A and A' become too cold to heat the gas and air, and the regenerators B and B' have been highly heated, the operation is reversed, the valves G and F being shifted into the positions indicated by the dotted lines $g$ and $f$, the gas now entering B', and after being heated, passing into and through the chamber C to $e'$, where it meets the current of hot air traveling from regenerator B through the flue E, and is consumed, the products of combustion passing through ports $a$ and $a'$ into regenerators A and A', which are thus heated anew. If the air is required to be cold, or it is not desired to heat it, the regenerators A' and B may be dispensed with, and air may be taken directly into the flues D and E by means of the draft of the furnace through suitable openings which can be closed by the slabs or valves H and H'.

It will be noticed that, by placing the valves F and G back of the air-flues $b$ and $a'$, I convert my furnace into a regular open-hearth regenerating-furnace, permitting the air and gas to mingle as it enters the combustion-chamber; or, by having the valves set as shown in the drawings, I provide a furnace in which the air is mixed with the gas after it has passed through the melting-chamber; or, by placing both dampers on the wall which separates the air from the gas-regenerators, I prevent the heating of the air-regenerators, concentrate or confine the waste products of combustion to the gas-regenerators, and am enabled to supply cold or partially-heated air to either end of the furnace as is desired.

The hearth of the furnace may be inclined or horizontal, and it may be made stationary or rotating, as may be desired; and the furnace may have any suitable lining. A carbonaceous lining may be used when a rapid reducing action is wanted.

This apparatus may be operated as a roasting-furnace by exchanging gas for air and air for gas in the regenerators, so that air will pass through the furnace and gas will pass through the flue D and E alternately, combustion being effected, as in the former case, at the points $d'$ and $e'$, respectively.

I am aware that a furnace has been so constructed that a current of gas heated by regenerators has been made to pass through the furnace-chamber, and has afterward been burned by admixture with cold air for the purpose of heating other regenerators; but in these cases the air-regenerators have had no connection with the ports admitting air to consume the gas being held in reserve for use only when the furnace is operated like an ordinary open-hearth furnace. At the same time there has been no means provided to shut off the air-regenerators from the hearth, and of thus preventing the mixture of their contents with the stream of gas passing through the furnace, or the formation of explosive mixtures in the regenerators themselves.

I am also aware that a furnace has been constructed with gas-regenerators only, so that the gas heated by the regenerator on the incoming side has been passed through and out of the furnace-chamber, and has there been mixed in the regenerator on the outgoing side with air warmed by an independent apparatus different from the ordinary regenerator, and forced by a blowing apparatus through pipes to the point of mixture. In this furnace the air is heated by the products of combustion after they have lost most of their heat by passing through the regenerator proper on the outgoing side, and have thus become unfit to properly heat the air.

In my furnace the air is heated in the regenerators A' and B, is led directly across or through the furnace-chamber in suitable pipes to the points $d'$ and $e'$, when it mixes with and consumes the gas, while at the same time it is completely shut off by the valves F and G, and prevented from mixing with the hot gas until it has reached the points $d'$ or $e'$.

Having thus described my invention, what I claim, and desire to secure by Letters Patent, is—

1. In a regenerative furnace of the character described, the air-regenerators of which are provided with a valve or valves at their top near the melting tank or chamber, as set forth, and conduits or flues leading directly to the melting-chamber, and conduits leading around the melting-chamber and opening into the opposite end of the same, whereby the air can be mingled with the gas before entering the melting-chamber or at a point where the gas leaves the melting-chamber, as set forth.

2. A regenerative furnace in which the air-regenerators are provided with valves, as described, to form communication with suitable ducts located within the walls or arch of the furnace, which convey the heated air around and mingle it with the gas at the point where the gas leaves the melting-chamber, whereby a complete combustion of the gas is effected to heat the regenerators, as set forth.

3. In a regenerative furnace, the gas-generators A and B', opening into the combustion or melting chamber, in combination with the ports or flues D and E, whereby the external air is admitted at either end of the combustion-chamber, as set forth.

4. In a regenerative gas-furnace, the combination of the air-regenerators A' and B, provided with the valves F and G, with the flues D and E, whereby the heated air is mingled with the gas and the point of combustion placed beyond the hearth and near to the other set of regenerators.

THOMAS T. MORRELL.

Witnesses:
CYRUS ELDER,
JAS. M. SWANK, Jr.